(12) United States Patent
D'Silva et al.

(10) Patent No.: US 12,399,736 B2
(45) Date of Patent: Aug. 26, 2025

(54) PASSIVE-ENABLED APPLICATIONS FOR A COMPUTING DEVICE

(71) Applicant: Google LLC, Mountain View, CA (US)

(72) Inventors: Charmaine D'Silva, Mountain View, CA (US); Paul Nicholas Gennai, San Francisco, CA (US); Andrew Devron Stadler, San Francisco, CA (US); Ritesh Reddy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 903 days.

(21) Appl. No.: 16/978,662

(22) PCT Filed: Feb. 15, 2019

(86) PCT No.: PCT/US2019/018138
§ 371 (c)(1),
(2) Date: Sep. 4, 2020

(87) PCT Pub. No.: WO2020/117298
PCT Pub. Date: Jun. 11, 2020

(65) Prior Publication Data
US 2020/0409747 A1    Dec. 31, 2020

Related U.S. Application Data

(60) Provisional application No. 62/776,758, filed on Dec. 7, 2018.

(51) Int. Cl.
*G06F 9/48* (2006.01)
*G06F 9/445* (2018.01)
*G06F 9/54* (2006.01)

(52) U.S. Cl.
CPC .......... *G06F 9/485* (2013.01); *G06F 9/44505* (2013.01); *G06F 9/542* (2013.01)

(58) Field of Classification Search
CPC ....... G06F 9/485; G06F 9/44505; G06F 9/542
See application file for complete search history.

(56) References Cited

U.S. PATENT DOCUMENTS 6,718,535 B1    4/2004  Underwood
8,819,836 B2 *  8/2014  Stella ...................... H04L 9/14
                                                            726/25

(Continued)

FOREIGN PATENT DOCUMENTS

CN    102736954 A    10/2012
CN    108196997 A    6/2018

(Continued)

OTHER PUBLICATIONS

International Preliminary Report on Patentability from International Application No. PCT/US2019/018138, mailed Jun. 17, 2021, 10 pp.

(Continued)

*Primary Examiner* — Jorge A Chu Joy-Davila
(74) *Attorney, Agent, or Firm* — Shumaker & Sieffert, P.A.

(57) ABSTRACT

A processor of a computing device is described that receives user input to disable an application and determines whether the application is passive-enabled. Responsive to determining that the application is passive-enabled, the computing device causes the application to operate in a passive state. While the application operates in the passive state, one or more essential functions or services provided by the application that are required by an operating system of the computing device are enabled and any remaining functions or services provided by the application are disabled. After causing the application to operate in the passive state: the computing device outputs an indication that the application has been disabled in response to the user input to disable the application, and performs one or more operations that rely (Continued)

on the one or more essential functions or services provided by the application.

20 Claims, 5 Drawing Sheets

(56) References Cited

U.S. PATENT DOCUMENTS

| | | | | |
|---|---|---|---|---|
| 2013/0210461 A1* | 8/2013 | Moldavsky | ............. | H04W 4/02 455/456.3 |
| 2013/0219409 A1* | 8/2013 | Woley | ............. | G06F 9/542 719/313 |
| 2013/0283275 A1* | 10/2013 | Kim | ............. | G06F 9/445 718/100 |
| 2014/0373161 A1* | 12/2014 | Hudson | ............. | H04L 63/1433 726/25 |
| 2015/0079967 A1* | 3/2015 | Mullins | ............. | H04W 48/04 455/419 |
| 2016/0124516 A1* | 5/2016 | Schoon | ............. | G06F 1/1662 345/169 |
| 2016/0246594 A1* | 8/2016 | Shoavi | ............. | H04W 4/18 |
| 2017/0185788 A1* | 6/2017 | Qiu | ............. | G06F 9/44505 |
| 2018/0181461 A1* | 6/2018 | Gross | ............. | H04W 28/04 |

FOREIGN PATENT DOCUMENTS

| | | | | |
|---|---|---|---|---|
| FR | 3001814 A1 * | 8/2014 | ............. | G06F 9/485 |
| WO | WO-2007098401 A1 * | 8/2007 | ............. | G06F 8/54 |

OTHER PUBLICATIONS

Response to Communication Pursuant to Rules 161(1) and 162 EPC dated Oct. 7, 2020, from counterpart European Application No. 19709596.1, filed Mar. 31, 2021, 22 pp.

International Search Report and Written Opinion of International Application No. PCT/US2019/018138, dated Jul. 8, 2019, 16 pp.

Hill, "How to Disable Bloatware Apps on an Android Phone or Tablet | Digital Trends," Aug. 19, 2018, XPO55603102, retrieved from http://web.archive.org/web/20180819231757/https://www.digitaltrends.com/mobile/disable-apps-android/, 11 pp.

"How can Android run a disabled application?—Android Enthusiasts Stack Exchange," XPO55603062, retrieved from https://android.stackexchange.com/questions/196360/how-can-android-run-a-disabled-application, May 27, 2018, 2 pp.

Response to Communication pursuant to Article 94(3) EPC dated Mar. 28, 2022, from counterpart European Application No. 19709596.1 filed Jul. 20, 2022, 21 pp.

Communication pursuant to Article 94(3) EPC from counterpart European Application No. 19709596.1 dated Mar. 28, 2022, 8 pp.

First Office Action and Search Report from counterpart Chinese Application No. 201980025637.7 dated Sep. 13, 2023, 11 pp.

Second Office Action, and translation thereof, from counterpart Chinese Application No. 201980025637.7 dated Apr. 17, 2024, 7 pp.

Notice of Intent to Grant, and translation thereof, from counterpart Chinese Application No. 201980025637.7 dated Jul. 12, 2024, 4 pp.

Notice of Intent to Grant and Text Intended to Grant from counterpart European Application No. 19709596.1 dated Feb. 11, 2025, 44 pp.

* cited by examiner

PASSIVE-ENABLED APPLICATIONS FOR A COMPUTING DEVICE

BACKGROUND

Some computing devices, such as mobile phones, laptop computers, tablets, etc., are pre-loaded or pre-installed with software applications before being sold or delivered to consumers, or in some examples, after delivery and in response to a reinitialization or a full system reset. Some preinstalled applications may perform a mixture of user facing functions as well as "essential" system functions or services that are hidden from a user's view. An underlying operating system or other applications executing at the computing device may rely on these hidden functions or services to perform other functions or provide access to other services. A user may want to disable a pre-installed application, for instance, to free up storage space for other data on a device or to instead rely on a different application (e.g., one that performs similar user facing functions as the application that is being disabled but may or may not perform any of the "essential" system functions or services that are hidden from a user's view). Disabling a preinstalled application that performs essential system functions or services in this way may consequentially disable other features or services of the computing device, and in some cases, may even cause the computing device to be inoperable.

SUMMARY

In general, techniques of this disclosure may enable a computing device to maintain operational stability, even if in response to user input, the computing device disables an application that provides, or is at least tightly coupled to, one or more "essential" system functions or services. In other words, the techniques may enable essential functions and services of an application to remain operational, even if the application itself has been marked as disabled and therefore is hidden and not discoverable by the end user.

As one example, an application manager component (e.g., part of an operating system) of a computing device may maintain a record of each application that is installed on the computing device. The record may include information (e.g., a flag) indicating whether each application is "passive-enabled" or not. Being passive-enabled means that an application provides hidden or essential functionality, or access to hidden or essential services, that are relied on by or possibly integrated within the operating system of the computing device.

An application may execute in two of three operational states including: 1) an enabled state in which the application is fully functional and discoverable by an end user, and either 2) a disabled state in which the application is completely inoperable and undiscoverable by an end user, or 3) a passive state in which the application is only partially enabled to perform the essential or hidden functions of the application, while also being undiscoverable by an end user.

Each application, whether passive-enabled or not, may start out being in an "enabled" operational state, for instance in response to a system initialization or reinitialization. However, when an enabled application is requested to be disabled (e.g., based on user input), the application manager component may change the operational state of the application from enabled to either "disabled" or "passive". If the application record indicates that the application is not "passive-enabled" and therefore does not provide any hidden or essential functionality or access to hidden or essential services, the application management component may disable the application entirely. However, if the application is "passive-enabled", the application manager component may instead of disabling the application outright, configure the application to operate in a passive state in which the hidden or essential functions and services remain enabled and accessible by the operating system, but not accessible by any other applications executing at the computing device. Said differently, while operating in a passive state, all non-essential functions or services of an application may be disabled, the application may no longer be discoverable by an end user or other applications executing at the computing device, yet all essential functions or services provided by the application (i.e., those services or functions that are necessary to maintain operational continuity of the operating system of computing device) may remain enabled.

In this way, the techniques may enable more user control over which applications are installed and relied on by a computing device, without disrupting operational continuity and possibly stability of the system, even if an application that provides hidden functionality to the computing device, is disabled. That is, the described techniques may enable any application installed at a computing device to appear hidden or "disabled" without causing other disruptions to the computing device due to various features or services provided by the application from being accessed by the operating system of the computing device. A computing device that operates according to the described techniques may be more customizable and better tailored for its intended operational use. Even if applications provide some essential functionality, a user can still remove those applications, without disrupting the operating system that relies on their essential functionality.

In one example, a method is described that includes receiving, by a computing device, via a user interface of the computing device, user input to disable an application; determining, by the computing device, whether the application is passive-enabled; responsive to determining that the application is a passive-enabled, causing, by the computing device, the application to operate in a passive state, wherein while the application operates in the passive state, one or more essential functions or services provided by the application that are required by an operating system of the computing device are enabled and any remaining functions or services provided by the application are disabled; and after causing the application to operate in the passive state: outputting, by the computing device, via the user interface of the computing device, an indication that the application has been disabled in response to the user input to disable the application; and performing, by the computing device, one or more operations that rely on the one or more essential functions or services provided by the application.

In another example, a computing device is described that includes a storage device and at least one processor. The at least one processor is configured to receive, via a user interface of a computing device, user input to disable an application; determine whether the application is passive-enabled; responsive to determining that the application is a passive-enabled, cause the application to operate in a passive state, wherein while the application operates in the passive state, one or more essential functions or services provided by the application that are required by an operating system of the computing device are enabled and any remaining functions or services provided by the application are disabled; and after causing the application to operate in the passive state: output, via the user interface of the computing device, an indication that the application has been disabled in response to the user input to disable the application; and perform one or more operations that rely on the one or more essential functions or services provided by the application.

In another example, a computer-readable storage medium is described having instructions that, when executed, cause at least one processor of a computing device to: receive, via a user interface of a computing device, user input to disable an application; determine whether the application is passive-enabled; responsive to determining that the application is a passive-enabled, cause the application to operate in a passive state, wherein while the application operates in the passive state, one or more essential functions or services provided by the application that are required by an operating system of the computing device are enabled and any remaining functions or services provided by the application are disabled; and after causing the application to operate in the passive state: output, via the user interface of the computing device, an indication that the application has been disabled in response to the user input to disable the application; and perform one or more operations that rely on the one or more essential functions or services provided by the application.

In yet another example, a system is described including means for receiving user input to disable an application; means for determining whether the application is passive-enabled; responsive to determining that the application is a passive-enabled, means for causing the application to operate in a passive state, wherein while the application operates in the passive state, one or more essential functions or services provided by the application that are required by an operating system of the computing device are enabled and any remaining functions or services provided by the application are disabled; and after causing the application to operate in the passive state: means for outputting an indication that the application has been disabled in response to the user input to disable the application; and means for performing one or more operations that rely on the one or more essential functions or services provided by the application.

The details of one or more examples are set forth in the accompanying drawings and the description below. Other features, objects, and advantages of the disclosure will be apparent from the description and drawings, and from the claims.

DETAILED DESCRIPTION

Figure 1:
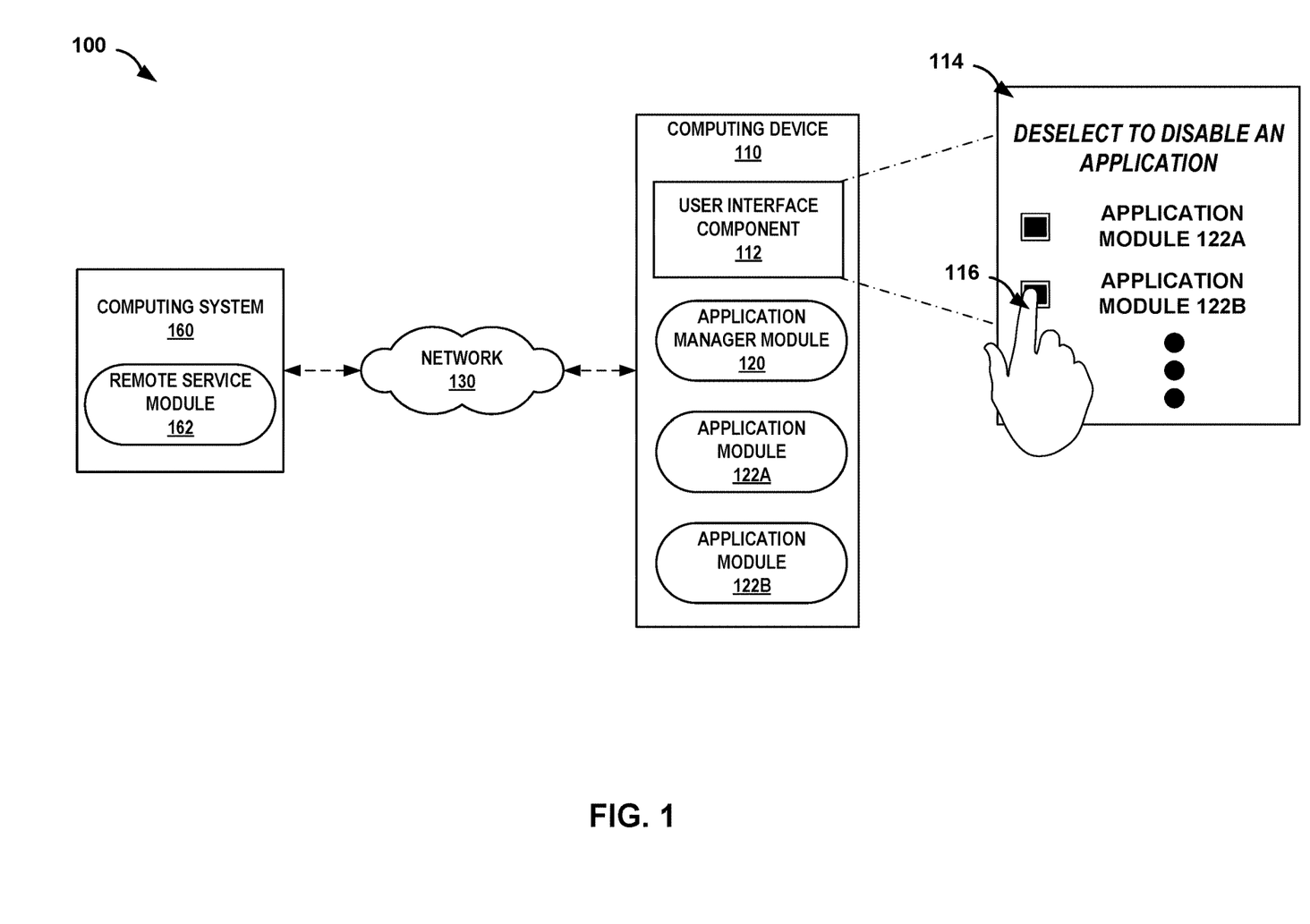
FIG. 1 is a conceptual diagram illustrating an example system configured to disable an application executing at the computing device, without disrupting essential functions or services that the application provides to the computing device, in accordance with one or more aspects of the present disclosure.

FIG. 1 is a conceptual diagram illustrating an example system configured to disable an application executing at the computing device, without disrupting at least some of the functions or services that the application provides to the computing device, in accordance with one or more aspects of the present disclosure. System 100 includes computing system 160 in communication, via network 130, with computing device 110. Although operations attributed to system 100 are described primarily as being performed by a single computing device 110 and/or a single computing system 160, in some examples, the operations of system 100 may be performed by additional or fewer computing devices and computing systems than what is shown in FIG. 1. For example, some of the operations attributed to computing system 160 may be performed by computing device 110, or vice versa.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between computing system 160 and computing device 110. Computing system 160 and computing device 110 may transmit and receive data across network 130 using any suitable communication techniques.

Computing system 160 and computing device 110 may each be operatively coupled to network 130 using respective network links. The links coupling computing system 160 and computing device 110 to network 130 may be Ethernet, ATM or other types of network connections, and such connections may be wireless and/or wired connections.

Computing system 160 includes remote service module 162. Computing device 110 includes application manager module 120, application modules 122A and 122B (collectively "application modules 122"), and user interface component ("UIC") 112 which is configured to output user interface 114.

Computing system 160 represents any combination of one or more computers, mainframes, servers (including so-called "blades"), cloud computing systems, or other types of remote computing systems capable of exchanging information via network 130 as part of a remote computing service. For example, computing system 160 may provide access to an application provider service (e.g., application store, application data base, application repository, or other collection of applications) from which a client device, such as computing device 110, can download an application executable that the client device may then execute locally on-device. As another example, computing system 160 may provide access to an update service managed by an application developer or operating system developer that rolls-out patches, updates, fixes, and the like to applications or an operating system executed by client devices, such as computing device 110.

Computing device 110 represents any suitable computing device or computing system capable of exchanging information via network 130 to access the remote computing service provided by computing system 160. For example, computing device 110 may be a mobile device from which a user provides inputs to interact with a user interface associated with computing system 160, e.g., to cause computing device 110 to download application executables or updates from computing system 160 for local installation on computing device 110. Examples of computing device 110 include mobile phones, tablet computers, laptop computers, desktop computers, servers, mainframes, blades, wearable devices (e.g., computerized watches etc.), home automation devices, assistant devices, gaming consoles and systems, media players, e-book readers, television platforms, automobile navigation or infotainment systems, or any other type of mobile, non-mobile, wearable, and non-wearable computing devices configured to execute applications obtained from a remote computing service, such as that provided by computing system 160.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

Modules 120, 122, and 162 may perform operations described herein using software, hardware, firmware, or a mixture of hardware, software, and firmware residing in and/or executing at computing device 110 and computing system 160. Computing device 110 and computing system 160, may execute, respectively, modules 120 and 122, and module 162 with multiple respective processors or multiple respective devices, as respective virtual machines executing on underlying hardware, as one or more respective services of an operating system or computing platform, and/or as one or more respective executable programs at an application layer of a respective computing platform.

Remote service module 162 of computing system 160 controls operations of computing system 160 for implementing a remote computing service. In some examples, remote service module 162 may output a user interface from which a user of a client device, such as computing device 110, can provide inputs to interact with the remote service. For example, in the context of an application provider service or an update service, remote service module 162 may obtain, via a user interface, user inputs to select applications for download onto computing device 110 or to select updates, patches, or fixes for installation at computing device 110. An application provider service and an update service are just two example services that may be provided by remote service module 162. Other examples of services that may be provided by remote service module 162 include a gaming service, a business or productivity software service, a communications service, or other cloud-based computing service.

Application manager module 120 of computing device 110 manages the applications installed on computing device 110, including performing operations to enable, disable, install, or uninstall applications. Application manager module 120 may be a subroutine or part of an operating system, operating platform, or other application or executable installed on computing device 110. Application manager module 120 may receive, from remote service module 162 and via network 130, in addition to application related files (e.g., libraries, executables, source files, and the like), updates, application recommendations, and other information, an indication of whether any applications of computing device 110 are passive-enabled or not.

Application manager module 120 may cause UIC 112 to display user interface 114. User interface 114 represents a user interface for providing user controls application manager module 120. Specifically, user interface 114 enables a user to indicate to application manager module 120 whether applications that are installed onto computing device 110 should be enabled or disabled. For example, a user may provide user input 116 to deselect application module 122B which may cause application manager module 120 to transition application module 122B out of operating in an enabled state and therefore appear to the user to be "disabled". However, as will become clear from the rest of the description of FIG. 1, whether application manager module 120 causes application module 122B to truly be disabled, or instead to be executing in a passive state, depends on whether application module 122B is passive-enabled or not.

Each of application modules 122 represents an independent, machine-readable, executable or package configured to operate at an application layer of computing device 110. Computing device 110 may execute instructions associated with each of application modules 122, to perform a function or provide a service. Application manager module 120 manages application modules 122, for example, by controlling whether each operates in an enabled or either a passive or disabled state.

Although examples of application modules 122 are too numerous to list in their entirety, application modules 122 may include, to provide a few examples of categories of different applications, business or productivity applications, developer tools, educational applications, entertainment applications, financial applications, game applications, graphic or design applications, health and fitness applications, lifestyle or assistant applications, medical applications, music applications, news applications, photography, video, and other multimedia applications, reference applications, social networking applications, sports applications, travel applications, utility applications, weather applications, communication applications, calendar applications, or any other category or type of application.

Each of application modules 122 may be loaded or installed onto computing device 110 during manufacturing of computing device 110 or prior to delivery of computing device 110 to an end user. As one example, an original equipment manufacturer (OEM) of computing device 110 may load application modules 122 onto computing device 110 during final assembly. As another example, a business partner to the OEM, such as a telecommunications service provider (e.g., a mobile network provider) may load application modules 122 onto computing device 110 as a condition to computing device 110 communicating on their respective communications network.

Each of application modules 122 may be associated with respective "feature strings" used by remote services, such as the remote service provided by remote service module 162, to determine capabilities of computing device 110. The feature strings associated with application modules 122 may be hardcoded into an operating system of computing device 110 and shared with remote service module 162 when computing device 110 first connects to network 130, e.g., during initialization or reinitialization. The feature strings may indicate to remote service module 162, which applications are installed on computing device 110 and of the applications installed on computing device 110, what are each of the application's respective capabilities (e.g., passive-enabled, not passive-enabled, etc.).

Each of application modules 122 may execute in two of three operational states including: 1) an enabled state in which the application is fully functional and discoverable by an end user, and either 2) a disabled state in which the application is completely inoperable and undiscoverable by an end user, or 3) a passive state in which the application is only partially enabled to perform the essential or hidden functions of the application, while also being undiscoverable by an end user. Some of application modules 122 may be passive-enabled and therefore configured to operate in either the enabled state or the passive state and some of application modules 122 may not be passive-enabled and therefore configured to operate in either the enabled state or the disabled state. For ease of description, application module 122B is an example of a passive-enabled application and application module 122A is an example of an application that is not passive-enabled.

By being passive enabled, application module 122B may continue to perform various functions relied on by an operating system of computing device 110 even though application module 122B is disabled and not accessible to a user or other applications executing at computing device 110. In other words, an operating system or operating platform of computing device 110 may continue to rely on at least some aspect of application module 122B to perform one or more hidden operating system functions even when access to application module 122B, by any other entity (e.g., a user, a different application, etc.), is restricted.

As one example, application module 122B may be a passive-enabled search application that, in addition to performing user-visible search functions and handling search operations for various other applications executing at computing device 110, performs other functions on behalf of an operating system of computing device 110. For example, application module 122B may provide an interface from which application manager module 120 can communicate with remote service modules 162. The interface associated with application module 122B may not otherwise be available to other applications that execute outside of application module 122B.

Application module 122A may be a different search application, that is not passive-enabled, and is configured to perform search related functions that are visible to the user and/or other applications executing at computing device 110. A user of computing device 110 may prefer to only use application module 122A to perform search related operations and therefore choose to disable application module 122B (e.g., to make room for the installation of application modules 122A or other applications). However, application module 122A may not be capable of performing any of other functions performed by application module 122B that are relied on by the operating system of computing device 110. Therefore, disabling application module 122B outright may cause computing device 110 to be inoperable.

However, because application module 122B is passive-enabled, a user can provide input to computing device 110 to "disable" application module 122B (e.g., to make room for application module 122A) without disabling the hidden functions performed by application module 122B that area relied on by the operating system of computing device 110. From a user's point of view, application manager module 120 may indicate (e.g., via user interface 114) that application module 122B is disabled. However, from the operating system's point of view, application module 122B appears enabled and continues to perform essential functions or services that are relied on by the operating system.

Application manager module 120 is configured to exchange information with remote service module 162 to manage passive-enabled and non-passive enabled applications that are installed or about to be installed at computing device 110. For example, application manager module 120 may send, to remote service module 162, one or more feature strings that have been hardcoded into an operating system executing at computing device 110. Application manager module 120 may receive, from remote service module 162 and via network 130, in addition to application related files (e.g., libraries, executables, source files, and the like), updates, application recommendations, and other information, an indication of whether any applications of computing device 110 are passive-enabled. Application manager module 120 may maintain a record of each application that is installed on computing device 110. The record may include information (e.g., a flag) indicating whether each application module 122 is passive-enabled or not passive-enabled.

In order to improve or tailor the service provided to a client device, such as computing device 110, remote service module 162 may query each client device for information about the client device's respective capabilities, including, as one example, information about the applications executing at each client device. Remote service module 162 may determine the respective capabilities of a client device by analyzing feature strings received from the client device.

For example, during an initialization or reinitialization of computing device 110, application manager modules 120 may communicate with remote service module 162 to configure computing device 110 to work with the service provided by remote service module 162. During initialization or reinitialization, remote service module 162 may receive from application manager modules 120 one or more feature strings associated with the different applications executing at computing device 110. Based on the feature strings, remote service module 162 may provide application manager module 120 with feedback about the various applications executing at computing device 110. For example, the feedback may indicate to application manager modules 120 how to properly manage the applications executing at computing device 110.

As one example, when computing device 110 boots up for a first-time during initialization, or following a system reset during reinitialization, application manager module 120 may access remote service module 162. During this initial access, remote service module 162 may receive respective feature strings associated with each of application modules 122 and output information indicating whether any of application modules 122 executing at computing device 110 is passive-enabled or not. For example, a feature string associated with application module 122A may indicate application module 122A is not passive-enabled, and remote service modules 162 may output a message or other signal that causes application manager module 120 maintain application module 122A in either an enabled state or a disabled state. Whereas, a feature string associated with application module 122B may indicate application module 122B is passive-enabled, and application manager modules 120 may therefore maintain application module 122B in either an enabled state or a passive state.

In addition to providing feedback to computing device 110 based on the feature strings received from computing device 110, remote service module 162 may modify the service provided to computing device 110, based on information contained in the feature strings. For example, remote service module 162 may adjust or tailor the types of service provided to computing device 110, based on the capabilities associated with application modules 122 that remote service module 162 infers from the feature strings. As one example, remote service modules 162 may provide a first level of service when a feature string associated with application module 122B indicates application module 122B is a first version from a developer, and remote service module 162 may provide a second, different level of service when the feature string associated with application module 122B indicates application module 122B is a second, updated version from the developer.

In this way, the techniques may enable more user control over which applications are installed and relied on by a computing device, without disrupting operational continuity and possibly stability of the system, even if an application that provides hidden functionality to the computing device, is disabled. That is, the described techniques may enable any application installed at a computing device to appear hidden or "disabled" without causing other disruptions to the computing device due to various features or services provided by the application from being accessed by the operating system of the computing device. A computing device that operates according to the described techniques may be more customizable and better tailored for its intended operational use. Even if applications provide some essential functionality, a user can still remove those applications, without disrupting the operating system that relies on their essential functionality. As such, the described techniques further promote operational stability of the operating system, while providing user control over what applications are enabled or not.

Figure 2:
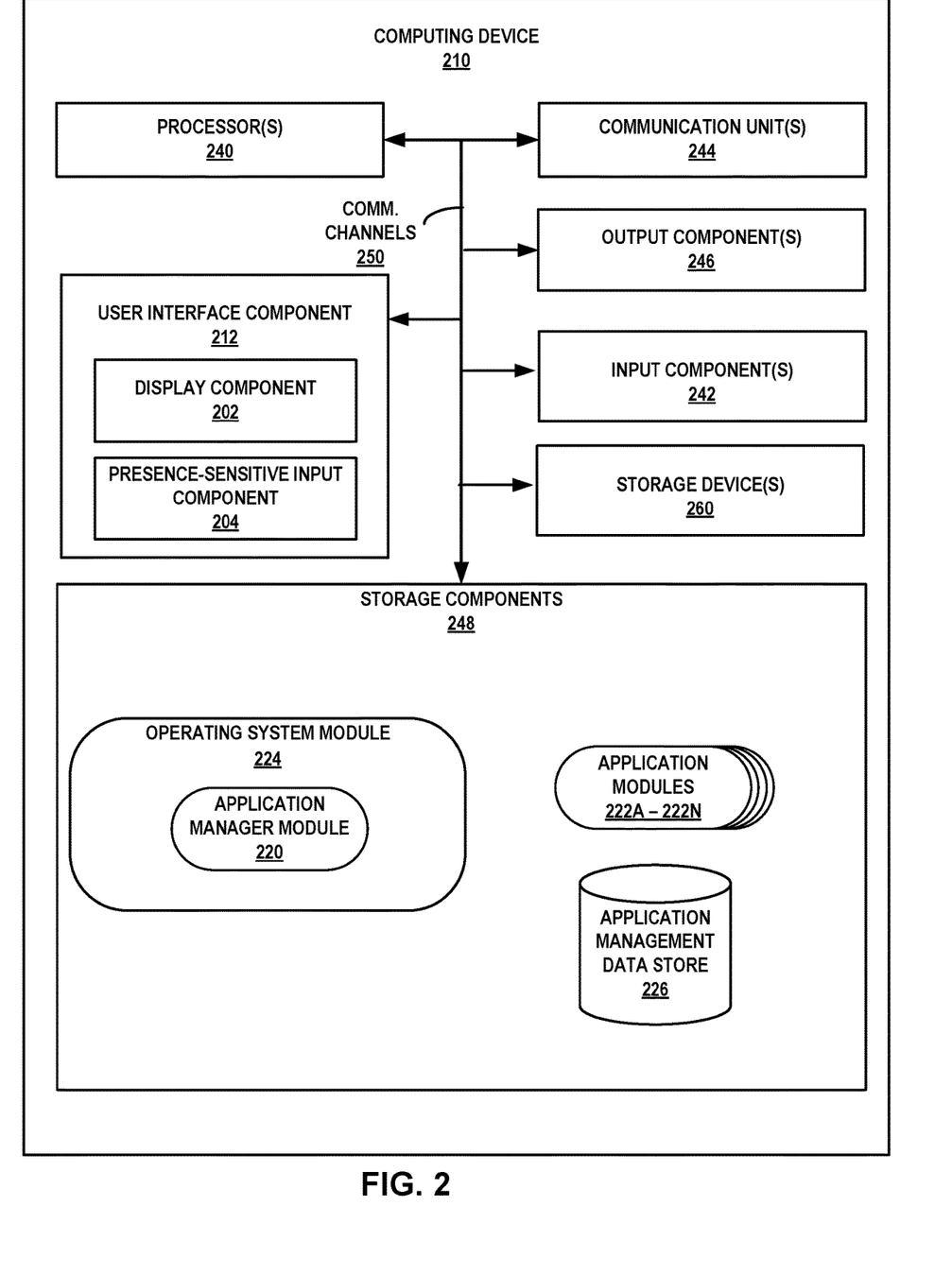
FIG. 2 is a block diagram illustrating an example computing device configured to disable an application, without disrupting essential functions or services that the application provides to the computing device, in accordance with one or more aspects of the present disclosure.

FIG. 2 is a block diagram illustrating an example computing device configured to disable an application, without disrupting essential functions or services that the application provides to the computing device, in accordance with one or more aspects of the present disclosure. Computing device 210 of FIG. 2 is an example of computing device 110 of FIG. 1 and is described in the context of computing device 110. Computing device 210 may include some or all of the capabilities of computing device 110. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more input components 242, one or more communication units 244, one or more output components 246, and one or more storage components 248. UIC 212 includes display component 202 and presence-sensitive input component 204.

Storage components 248 of computing device 210 also includes operating system module 224, application manager module 220, and application modules 222A through 222N (collectively "application modules 222"). Additionally, storage components 248 includes application management data store 226, which may be referred to simply as "data store 226".

Communication channels 250 may interconnect each of the components 202, 204, 212, 214, 220, 222, 224, 226, and 248 for inter-component communications (physically, communicatively, and/or operatively). In some examples, communication channels 250 may include a system bus, a network connection, an inter-process communication data structure, or any other method for communicating data.

One or more input components 242 of computing device 210 may receive input. Examples of input are sensor, tactile, audio, and video input. Input components 242 of computing device 200, in one example, includes a presence-sensitive display, touch-sensitive screen, sensor, mouse, keyboard, voice responsive system, video camera, microphone or any other type of device for detecting input from a human or machine. In some examples, input components 242 include one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 246 of computing device 210 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 210 may communicate with external devices via one or more wired and/or wireless networks by transmitting and/or receiving network signals on the one or more networks. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

UIC 212 of computing device 210 is an example of UIC 112 of computing device 110. For example, UIC 212 may display a graphical user interface, such as user interface 114, from which a user of computing device 210 may provide input to, or review output from, computing device 210.

UIC 212 includes display component 202 and presence-sensitive input component 204. Display component 202 may be a screen at which information is displayed by UIC 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x,y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202.

While illustrated as an internal component of computing device 210, UIC 212 may also represent and external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 210. For example, processors 240 on computing device 210 may receive and execute instructions stored by storage components 248 that execute the functionality of modules 220, 222, and 224. The instructions executed by processors 240 may cause computing device 210 to store information within storage components 248 during program execution, for example, at data store 262. Examples of processors 240 include application processors, display controllers, sensor hubs, and any other hardware configure to function as a processing unit. Modules 220, 222, and 224 may be operable by processors 240 to perform various actions or functions of computing device 210.

One or more storage components 248 within computing device 210 may store information for processing during operation of computing device 210 (e.g., computing device 210 may store data accessed by modules 220, 222, and 224 during execution at computing device 210). In some examples, storage component 248 is a temporary memory and in other examples, storage component 248 is a computer-readable storage medium.

As a memory, a primary purpose of storage component 248 may not be configured for long-term storage but rather, may be configured for short-term storage of information as volatile memory and therefore not retain stored contents if computing device 210 is powered off. Examples of volatile memories include random access memories (RAM), dynamic random access memories (DRAM), static random access memories (SRAM), and other forms of volatile memories known in the art. Storage components 248, in some examples, also include one or more computer-readable storage media. Storage components 248 may be configured to store larger amounts of information than volatile memory.

Storage components 248 may be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, and 224, as well as data store 262.

Operating system module 224 manages resources associated with computing device 210 to enable hardware, software, and firmware components to perform various functions or actions. Operating system module 224 may also be referred to as an operating platform. Operating system module 224 may perform various system functions, including managing a file system, performing virtual and/or physical memory allocations, allowing customizations of settings, and other functions. Operating system module 224 may include application manager module 220 and in some cases, may rely on passive-enabled applications, even when the passive-enabled applications are enabled, to perform hidden functions.

Application modules 222A through 222N (collectively "application modules 222") are a collection of passive-enabled and not, passive-enabled applications executing at computing device 210. Application module 222A may be a passive-enabled application, similar to application module 122B and application module 222N may be not be passive-enabled, similar to application module 122A.

Application manager module 220 is an example of application manager module 120 of FIG. 1 and manages the applications installed on computing device 210, including performing operations to enable, disable, install, or uninstall applications. Application manager module 220 may be a subroutine or otherwise called on by operating system module 224, to perform application management functions on behalf of operating system module 224.

One management function performed by application manager module 220 may include interacting with a remote computing service to configure computing device 210 to properly access the remote computing service or properly manage application modules 222. As one example, application manager module 220 may manage one or more feature strings associated with operating system module 224 and share the feature strings with a remote computing service so that the remote computing service properly handles subsequent interactions with computing device 210. For instance, application manager module 220 may send, to remote service module 162 of computing system 160, a feature string associated with operating system module 224. In response to sending the feature string, application manager module 220 may receive, from remote service module 162, an indication of which, if any, of application modules 222 is passive-enabled or not, as indicated by the feature string. Besides receiving an indication of which application modules 222 is passive-enabled, application manager module 220 may receive other application related information, such as application related files, updates, application recommendations, and other information.

Application manager module 220 may maintain a record indicating which application modules 222 is passive-enabled. For example, application manager module 220 may maintain a list or other suitable data structure indicative of which application modules 222 is passive-enabled, at application management data store 226. Application management data store 226 may be searchable and in response to a query about a particular one of application modules 222, return information about the particular application, including a flag or other indication as to whether that application module 222 is passive-enabled or a current state associated with that application module 222. That way, during future interactions with application modules 222, application manager module 220 may query application management data store 226 to determine which state any of application modules 222 is operating in (e.g., enabled, disabled, or passive) or whether any of application modules 222 is passive-enabled, and interact with that application modules 222 accordingly.

Application manager module 220 may be in charge of transitioning application modules 222 in to, and out of, executing in an enabled, or either a passive or disabled state. When any of application modules 222 is operating in a passive state, application manager module 220 prevents any other of application modules 222 from interacting with that application module 222 but still allows operating system module 224 to utilize any essential system services, as if that application module 222 were still enabled.

For example, in response to receiving information from operating system module 224 to disable application module 222A, (e.g., based on user inputs at user interface 114 or other similar user interface) application manager module 220 may cause application module 222A to operate in a passive-state. Application manager module 222 may output a broadcast to application module 222A in response to a user input to disable application module 222A. The broadcast, once received by application module 222A, causes application module 222A to transition from operating in an enabled state to operating in the passive state.

After transitioning to the passive state, application module 222A may provide feedback or other acknowledgment to application manager module 220 responding to application manager module 220 that indeed application module 222A is operating in the passive state. Application manager module 220 may record a current state associated with application module 222A at application management data store 226 to indicate that application module 222A is operating in the passive-state.

Once operating in a passive-state, application manager module 220 or an application module 222 itself, may prevent any other application modules 222 from accessing functions or services provided by that application module 222. At the same time, once operating in the passive-state, application manager module 220 or the application module 222 itself, may enable operating system module 224 to access any essential functions or services provided by that application module 222. For example, application module 222A may be a search related application that execute searches on a user's behalf or behalf of other application modules 222. When enabled, any of application modules 222, in addition to operating system module 224, may call on application module 222A to execute a search function. However, when executing in the passive state, the search function may only be accessible by operating system module 224 and the other application modules 222 may have to rely on a different application modules 222 or function of operating system module 224, to perform similar search functions.

In some examples, to a user (e.g., via a device settings menu such as user interface 114), any application that operates in a disabled or passive state, may appear to a user to be uninstalled or otherwise removed from computing device 210. In other words, in continuing the above example, even though application module 222A may continue to perform various functions on behalf of operating system module 224, the executable and associate files related to application modules 222A may not be visible from a file system user interface or device settings menu. In some examples, if a user accesses an online application store or other repository (e.g., managed by remote service module 162), a menu associated with the online application store may indicate that application module 222A is uninstalled and not executing on computing device 210.

Then, if the user selects application module 222A for installation, application manager module 220 may refrain from downloading, from the remote application repository, an executable package associated with application module 222. And instead, in response to receiving the user input to download and install application module 222A, application manager module 220 may output a broadcast that enables application module 222. Upon receipt of the broadcast, application module 222A may transition from operating in the passive state to operating in the enabled state and appear to the user to have recently been downloaded and installed onto computing device 210.

Figure 3A:
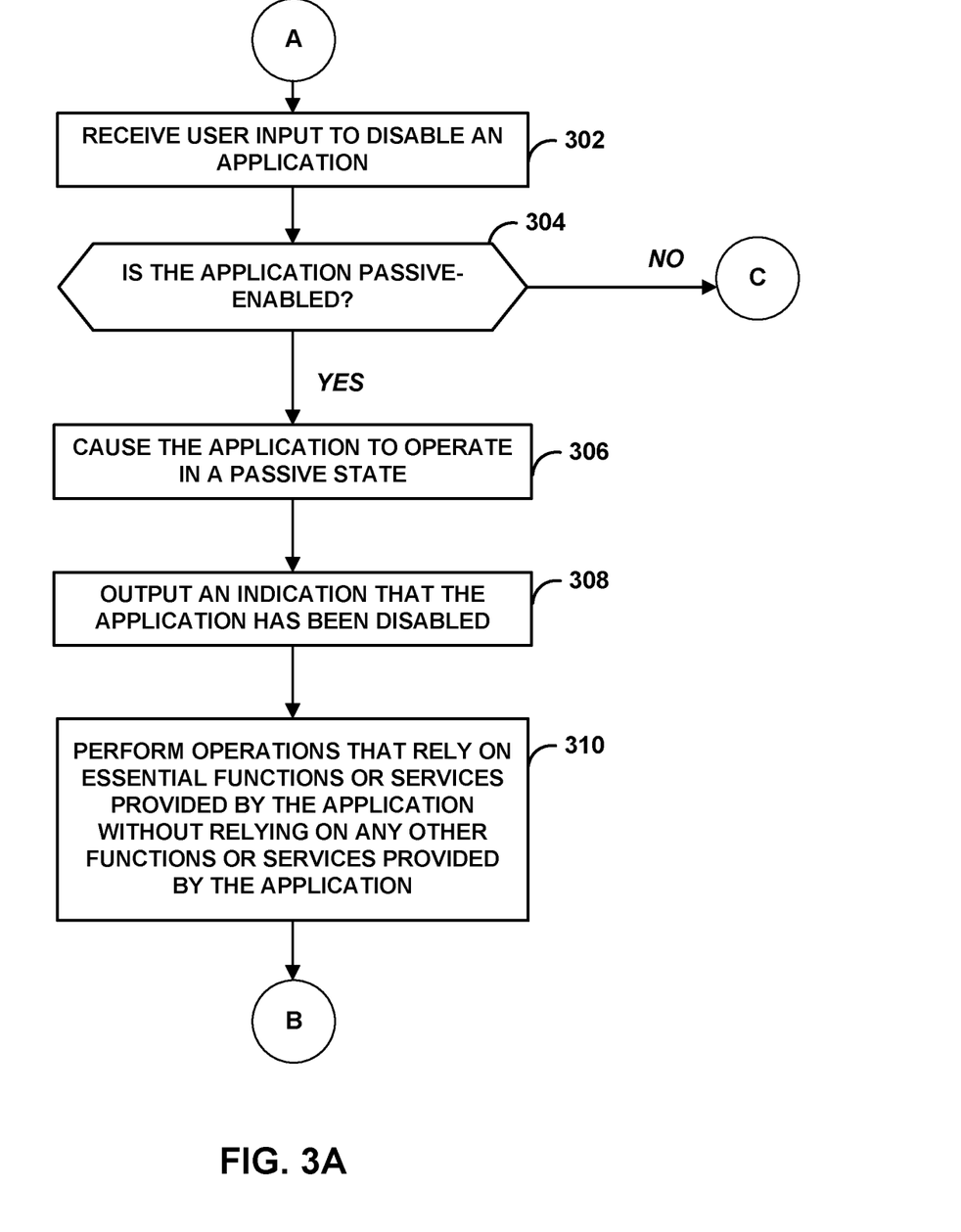
FIGS. 3A through 3C are flowcharts illustrating example operations of an example computing system configured to disable an application, without disrupting essential functions or services that the application provides to the computing device, in accordance with one or more aspects of the present disclosure.
Figure 3B:
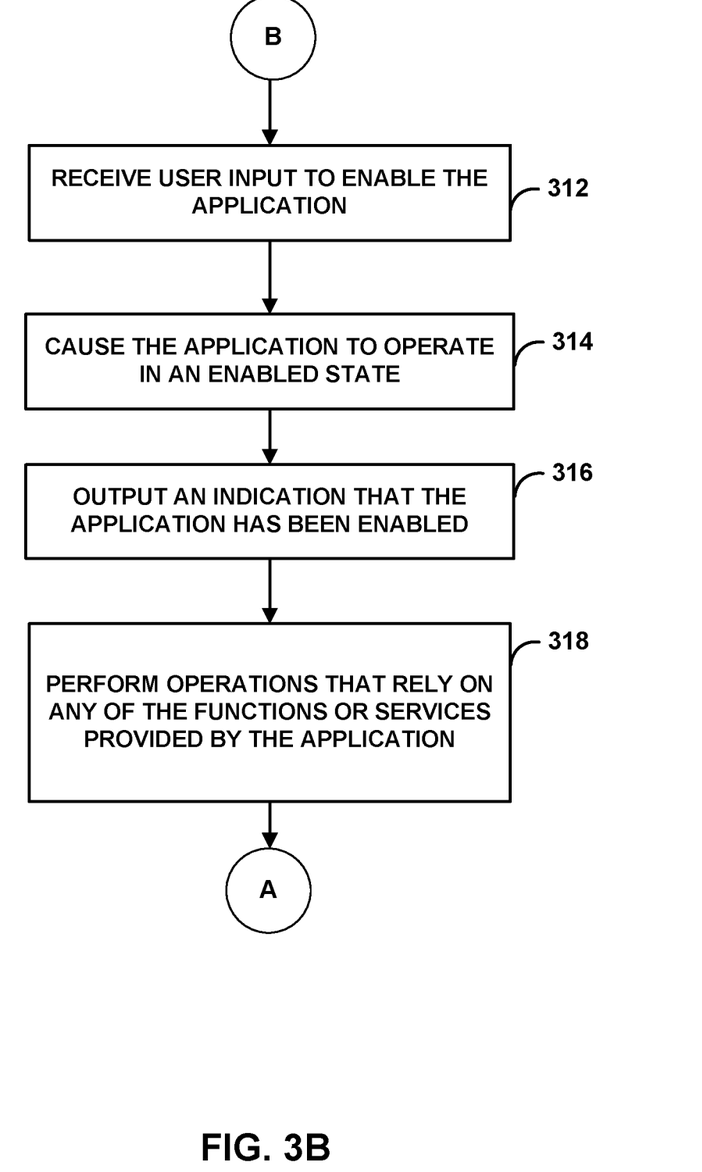
Figure 3C:
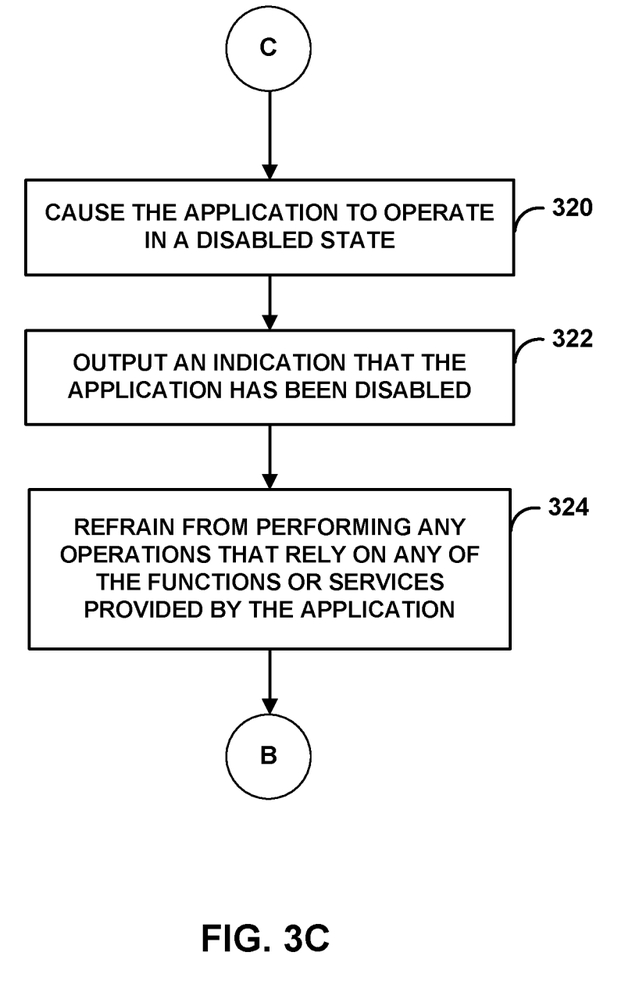

FIGS. 3A through 3C are flowcharts illustrating example operations of an example computing system configured to disable an application, without disrupting essential functions or services that the application provides to the computing device, in accordance with one or more aspects of the present disclosure. The processes of FIGS. 3A through 3C may be performed by one or more processors of a computing device, such as computing devices 110 and 210. The steps of the processes of FIGS. 3A through 3C may in some examples, be repeated, omitted, and/or performed in a different order than what is shown in FIGS. 3A through 3C. For purposes of illustration, FIGS. 3A through 3C are described below within the context of computing device 210 of FIG. 2.

In view of FIG. 3A, and in operation, computing device 210 may receive, via a user interface of computing device 210, user input to disable an application (302). For example, a user may interact with an application store or market place or settings menu of computing device 210, via a user interface displayed by UIC 212. Via the user interface, the user may gesture at UIC 212 to select a particular application that the user wants to be disabled or uninstalled. For example, the user may select application module 222A to be disabled.

In response to the user input, computing device 210 may determine whether the application is passive-enabled (304). For example, application manager module 220 may receive information from UIC 212 or operating system 224 indicating the user command to disable application module 222A. Application manager module 220 may perform a look-up of an identifier associated with application module 222A at data store 226 to determine whether application module 222A is passive-enabled or not.

Responsive to determining that the application is passive-enabled (304, YES branch), computing device 210 may cause the application to operate in a passive state (306). For example, application manager module 220 to output information that signals application module 222A to transition from operating in an enabled state to operating in a passive-state. Application module 222A may transition to operating in the passive state and send a message to application manager module 222 confirming the transition to passive state.

Computing device 210 may output an indication that the application has been disabled (308). While operating in the passive-state, application module 222A may appear to all other application modules 222 to be disabled whereas to operating system module 224, application module 222A may still appear to be enabled. Furthermore, application manager module 220 may cause a user interface associated with computing device 210 to indicate that application module 222A is disabled. While operating in the passive state, one or more essential functions or services provided by application module 222A may remain enabled and any remaining functions or services provided by application module 222A are disabled. For example, the enabled functions or services may give operating system module 224 access to a feature or function of application module 222A whereas the remaining functions, by being disabled, may prevent other application modules 222 from accessing any feature or function of application module 222A, including the feature or function available to operating system module 224.

Computing device 210 may perform one or more operations that rely on the one or more essential functions or services provided by the application (310). For example, operating system module 224 may rely on user information (e.g., a registration, a certificate, a user identifier, a device identifier, and the like) maintained by application module 222A to interact with a remote computing service, such as remote service module 162. For instance, the user information may enable operating system module 224 to continue to interact with remote service module 162 whereas other application modules 222 may be prevented from interacting with remote service module 162 as their access to application module 222A is restricted.

Turning to FIG. 3B, in operation, after causing the application to operate in the passive state, computing device 210 may receive user input to enable the application (312). For example, via the same user face that allowed the user to disable application module 222A, the user may provide further input at UIC 212 to enable application modules 222A.

Computing device 210 may cause the application to operate in an enabled state (314). For example, application manager module 220 may receive information about the user input to enable application module 222A and in response output a broadcast that is received by application module 222A (316). In response to the broadcast, application manager module 220 may receive a confirmation from application module 222A that the transition to the enabled state is complete. Application manager module 220 may update a record stored at data store 226 to indicate a current state of application module 222A as being enabled.

Computing device 210 may perform operations that rely on any of the functions or services provided by the application (318). For example, while application module 222A operates in the enabled state, each of the one or more essential functions or services provided by application module 222A, and any remaining functions or services provided by application module 222A, are enabled and accessible to operating system module 224 and any other application modules 222.

Turning now to FIG. 3C, responsive to determining that the application is passive-enabled (304, NO branch), computing device 210 may cause the application to operate in a disabled state (320). For example, application manager module 220 may output information, such as a broadcast or other operating system to application communication message, that causes application module 222N to transition from operating in an enabled state to operating in a disabled state. Application module 222N may transition to operating in the disabled state and send a message back to application manager module 220 confirming the transition to disabled state. When operating in the disabled state, all functions or services provided by application module 222N are disabled, meaning that none of the other application modules 222 and operating system module 224 may not access any function or service provided by application module 222N.

Computing device 210 may output an indication that application module 222N has been disabled in response to the user input to disable the application (322). For example, in response to receiving a confirmation from application module 222N that the transition to the disabled state is complete, application manager module 220 may update the record stored at data store 226 to indicate a current state of application module 222N as being disabled.

Computing device 210 may refrain from performing one or more operations that rely on the functions or services provided by the application (324). In other words, the functions or services provided by application module 222N may be completely disabled and unavailable to any other application modules 222 or operating system module 224 when application modules 222N operates in the disabled state.

Computing device 210 may perform operations 312-318 to enable application modules 222N, as described above in reference to FIG. 3B.

Clause 1. A method, comprising: receiving, by a computing device, via a user interface of the computing device, user input to disable an application; determining, by the computing device, whether the application is passive-enabled; responsive to determining that the application is a passive-enabled, causing, by the computing device, the application to operate in a passive state, wherein while the application operates in the passive state, one or more essential functions or services provided by the application are enabled and any remaining functions or services provided by the application are disabled; and after causing the application to operate in the passive state: outputting, by the computing device, via the user interface of the computing device, an indication that the application has been disabled in response to the user input to disable the application; and performing, by the computing device, one or more operations that rely on the one or more essential functions or services provided by the application.

Clause 2. The method of clause 1, wherein the application is a first application, the method further comprising: receiving, by the computing device, user input to disable a second application; determining, by the computing device, whether the second application is passive-enabled; responsive to determining that the second application is not passive-enabled, causing, by the computing device, the second application to operate in a disabled state, wherein while the application operates in the disabled state, all functions or services provided by the second application are disabled; and after the second application to operate in the disabled state: outputting, by the computing device, an indication that the second application has been disabled in response to the user input to disable the second application; and refraining, by the computing device, from performing one or more operations that rely on the functions or services provided by the second application.

Clause 3. The method of clauses 1 or 2, further comprising: prior to receiving the user input to disable the application, causing, by the computing device, the application to operate in an enabled state, wherein while the application operates in the enabled state, each of the one or more essential functions or services provided by the application are enabled and any of the remaining functions or services provided by the application are also enabled.

Clause 4. The method of any one of clauses 1-3, wherein determining whether the application is passive-enabled comprises: sending, by the computing device, to a remote computing system, a feature string associated with an operating system of the computing device; receiving, by the computing device, from the remote computing system, an indication of whether the feature string indicates that the application is passive-enabled; and determining, by the computing device, based on the indication of whether the application is passive-enabled, whether the application is passive-enabled.

Clause 5. The method of any one of clauses 1-4, wherein determining whether the application is passive-enabled comprises: determining, by the computing device, based on a feature string of an operating system of the computing device, whether the application is passive-enabled.

Clause 6. The method of any one of clauses 1-5, wherein determining whether the application is passive-enabled comprises: generating, by the computing device, a record indicating which applications of the computing device are passive-enabled; and determining, by the computing device, based on the record, whether the application is passive-enabled.

Clause 7. The method of any one of clauses 1-6, wherein causing the application to operate in the passive state comprises: outputting, by an application manager component of the computing device, a broadcast to the application in response to the user input to disable the application, wherein the broadcast indicates to the application to transition from operating in an enabled state to operating in the passive state.

Clause 8. The method of clause 7, further comprising: responsive to receiving the broadcast, responding, by the application, to the application manager component, that the application is operating in the passive state.

Clause 9. The method of clause 8, further comprising: preventing, by the application, any other application executing at the computing device from accessing the remaining functions or services provided by the application; and enabling, by the application, an operating system of the computing device to access the one or more essential functions or services provided by the application.

Clause 10. The method of any one of clauses 1-9, further comprising: further after causing the application to operate in the passive state: outputting, by the computing device, a user interface associated with a remote application repository, wherein a part of the user interface associated with the remote application repository indicates that the application is not installed on the computing device despite the computing device performing the one or more operations that rely on the one or more essential functions or services provided by the application.

Clause 11. The method of clause 10, further comprising: receiving, by the computing device, via the user interface associated with the remote application repository, user input to enable the application; and responsive to receiving the user input to enable the application, causing, by the computing device, the application to operate in an enabled state, wherein while the application operates in the enabled state, each of the one or more essential functions or services provided by the application are enabled and any remaining functions or services provided by the application are also enabled.

Clause 12. The method of clause 11, wherein causing the application to operate in the enabled state comprises: refraining from downloading, by the computing device, from the remote application repository, an executable package associated with the application in response to receiving the user input to enable the application; and outputting, by an application manager component of the computing device, a broadcast to the application in response to the user input to enable the application, wherein the broadcast indicates to the application to transition from operating in the passive state to operating in the enabled state.

Clause 13. A computing device comprising means for performing the method of any of clauses 1-12.

Clause 14. A computing device comprising at least one processor configured to perform the method of any of clauses 1-12.

Clause 15. A computer-readable storage medium storing instructions that, when executed, cause at least one processor to perform the method of any of clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A method, comprising:
receiving, by a computing device, via a user interface of the computing device, user input to disable a preinstalled application;
determining, by the computing device, whether the preinstalled application is passive-enabled, wherein a passive-enabled application is configured to operate in either an enabled state or a passive state, wherein, while the passive-enabled application operates in the passive state, the passive-enabled application is partially enabled and performs only essential functions or services of the passive-enabled application, the essential functions or services of the passive-enabled application being necessary to maintain operational continuity of a single operating system currently executed by the computing device;

responsive to determining that the preinstalled application is passive-enabled, causing, by the computing device, the preinstalled application to operate in the passive state, wherein while the preinstalled application operates in the passive state, one or more essential functions or services provided by the preinstalled application are enabled and any remaining functions or services provided by the preinstalled application that are not necessary to maintain operational continuity of the single operating system currently executed by the computing device are disabled; and after causing the preinstalled application to operate in the passive state:

outputting, by the computing device, via the user interface of the computing device, an indication that the preinstalled application has been disabled in response to the user input to disable the preinstalled application; and performing, by the computing device, one or more operations that rely on the one or more essential functions or services provided by the preinstalled application while the preinstalled application is inaccessible by an end user and other applications executing at the computing device.

2. The method of claim 1, wherein the application is a first application, the method further comprising:

receiving, by the computing device, user input to disable a second application;

determining, by the computing device, whether the second application is passive-enabled;

responsive to determining that the second application is not passive-enabled, causing, by the computing device, the second application to operate in a disabled state, wherein while the application operates in the disabled state, all functions or services provided by the second application are disabled; and after the second application is enabled to operate in the disabled state:

outputting, by the computing device, an indication that the second application has been disabled in response to the user input to disable the second application; and refraining, by the computing device, from performing one or more operations that rely on the functions or services provided by the second application.

3. The method of claim 1, further comprising:

prior to receiving the user input to disable the preinstalled application, causing, by the computing device, the preinstalled application to operate in an enabled state, wherein while the preinstalled application operates in the enabled state, each of the one or more essential functions or services provided by the preinstalled application are enabled and any of the remaining functions or services provided by the preinstalled application are also enabled.

4. The method of claim 1, wherein determining whether the preinstalled application is passive-enabled comprises:

sending, by the computing device, to a remote computing system, a feature string associated with the single operating system currently executed by the computing device;

receiving, by the computing device, from the remote computing system, an indication of whether the feature string indicates that the preinstalled application is passive-enabled; and determining, by the computing device, based on the indication of whether the preinstalled application is passive-enabled, whether the preinstalled application is passive-enabled.

5. The method of claim 1, wherein determining whether the preinstalled application is passive-enabled comprises:

determining, by the computing device, based on a feature string of the single operating system currently executed by the computing device, whether the preinstalled application is passive-enabled.

6. The method of claim 1, wherein determining whether the preinstalled application is passive-enabled comprises:

generating, by the computing device, a record indicating which applications of the computing device are passive-enabled; and determining, by the computing device, based on the record, whether the preinstalled application is passive-enabled.

7. The method of claim 1, wherein causing the preinstalled application to operate in the passive state comprises:

outputting, by an application manager component of the computing device, a broadcast to the preinstalled application in response to the user input to disable the preinstalled application, wherein the broadcast indicates to the preinstalled application to transition from operating in an enabled state to operating in the passive state.

8. The method of claim 7, further comprising:

responsive to receiving the broadcast, responding, by the preinstalled application, to the application manager component, that the preinstalled application is operating in the passive state.

9. The method of claim 8, further comprising:

preventing, by the preinstalled application, any other application executing at the computing device from accessing the remaining functions or services provided by the preinstalled application; and enabling, by the preinstalled application, the single operating system currently executed by the computing device to access the one or more essential functions or services provided by the preinstalled application.

10. The method of claim 1, further comprising:

receiving, by the computing device, via a user interface associated with a remote application repository, user input to enable the preinstalled application; and responsive to receiving the user input to enable the preinstalled application, causing, by the computing device, the preinstalled application to operate in an enabled state, wherein while the preinstalled application operates in the enabled state, each of the one or more essential functions or services provided by the preinstalled application are enabled and any remaining functions or services provided by the preinstalled application are also enabled.

11. The method of claim 10, wherein causing the preinstalled application to operate in the enabled state comprises:

refraining from downloading, by the computing device, from the remote application repository, an executable package associated with the preinstalled application in response to receiving the user input to enable the preinstalled application; and outputting, by an application manager component of the computing device, an operating system level broadcast to the preinstalled application in response to the user input to enable the preinstalled application, wherein the broadcast indicates to the preinstalled application to transition from operating in the passive state to operating in the enabled state.

12. A computing device comprising:
a memory configured to store a preinstalled application;
at least one processor configured to:
  receive, via a user interface of the computing device, user input to disable the preinstalled application;
  determine whether the preinstalled application is passive-enabled, wherein a passive-enabled application is configured to operate in either an enabled state or a passive state, wherein, while the passive-enabled application operates in the passive state, the passive-enabled application is partially enabled and performs only essential functions or services of the passive-enabled application, the essential functions or services of the passive-enabled application being necessary to maintain operational continuity of a single operating system currently executed by the computing device;
  responsive to determining that the preinstalled application is passive-enabled, cause the preinstalled application to operate in the passive state, wherein while the preinstalled application operates in the passive state, one or more essential functions or services provided by the preinstalled application are enabled and any remaining functions or services provided by the preinstalled application that are not necessary to maintain operational continuity of the single operating system currently executed by the computing device are disabled; and
  after causing the preinstalled application to operate in the passive state:
    output via the user interface of the computing device, an indication that the preinstalled application has been disabled in response to the user input to disable the preinstalled application; and
    performing, by the computing device, one or more operations that rely on the one or more essential functions or services provided by the preinstalled application while the preinstalled application is inaccessible by an end user and other applications executing at the computing device.

13. A non-transitory computer-readable storage medium storing instructions that, when executed, cause at least one processor to:
  receive, via a user interface, user input to disable a preinstalled application;
  determine whether the preinstalled application is passive-enabled, wherein a passive-enabled application is configured to operate in either an enabled state or a passive state, wherein, while the passive-enabled application operates in the passive state, the passive-enabled application is partially enabled and performs only essential functions or services of the passive-enabled application, the essential functions or services of the passive-enabled application being necessary to maintain operational continuity of a single operating system currently executed by a computing device;
  responsive to determining that the preinstalled application is passive-enabled, cause the preinstalled application to operate in the passive state, wherein while the preinstalled application operates in the passive state, one or more essential functions or services provided by the preinstalled application are enabled and any remaining functions or services provided by the preinstalled application that are not necessary to maintain operational continuity of the single operating system currently executed by the computing device are disabled; and
  after causing the preinstalled application to operate in the passive state:
    output via the user interface of the computing device, an indication that the preinstalled application has been disabled in response to the user input to disable the preinstalled application; and
    perform one or more operations that rely on the one or more essential functions or services provided by the preinstalled application while the preinstalled application is inaccessible by an end user and other applications executing at the computing device.

14. The computing device of claim 12,
wherein the preinstalled application is a first application, and
wherein the at least one processor is further configured to:
receive user input to disable a second application;
determine whether the second application is passive-enabled;
responsive to determining that the second application is not passive-enabled, cause the second application to operate in a disabled state, wherein while the application operates in the disabled state, all functions or services provided by the second application are disabled; and
after the second application to operate in the disabled state:
  output an indication that the second application has been disabled in response to the user input to disable the second application; and
  refrain from performing one or more operations that rely on the functions or services provided by the second application.

15. The computing device of claim 12, wherein the at least one processor is further configured to:
  prior to receiving the user input to disable the preinstalled application, cause the preinstalled application to operate in an enabled state, wherein while the preinstalled application operates in the enabled state, each of the one or more essential functions or services provided by the preinstalled application are enabled and any of the remaining functions or services provided by the preinstalled application are also enabled.

16. The computing device of claim 12, wherein the at least one processor is configured to:
  send, to a remote computing system, a feature string associated with the single operating system currently executed by the computing device;
  receive, from the remote computing system, an indication of whether the feature string indicates that the preinstalled application is passive-enabled; and
  determine, based on the indication of whether the preinstalled application is passive-enabled, whether the preinstalled application is passive-enabled.

17. The computing device of claim 12, wherein the at least one processor is configured to:
  determine, based on a feature string of the single operating system currently executed by the computing device, whether the preinstalled application is passive-enabled.

18. The computing device of claim 12, wherein the at least one processor is configured to:
   generate a record indicating which applications of the computing device are passive-enabled; and
   determine, based on the record, whether the preinstalled application is passive-enabled.

19. The computing device of claim 12, wherein the at least one processor is configured to:
   output, by an application manager component of the computing device, a broadcast to the preinstalled application in response to the user input to disable the application, wherein the broadcast indicates to the preinstalled application to transition from operating in an enabled state to operating in the passive state.

20. The method of claim 1, wherein the computing device determines that the essential functions or services of the passive-enabled application are necessary to maintain operational continuity of the single operating system based on determining whether disabling the essential functions or services would cause the computing device to be inoperable.

* * * * *